Jan. 1, 1963  A. MAYER  3,071,172
CAMERA CASE
Filed May 19, 1960
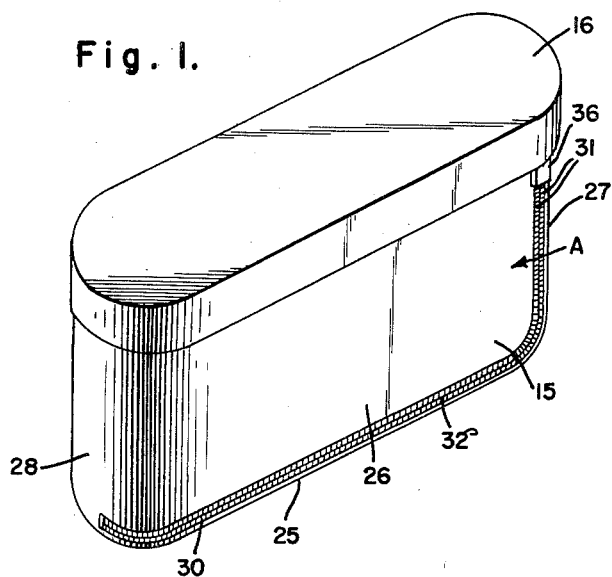
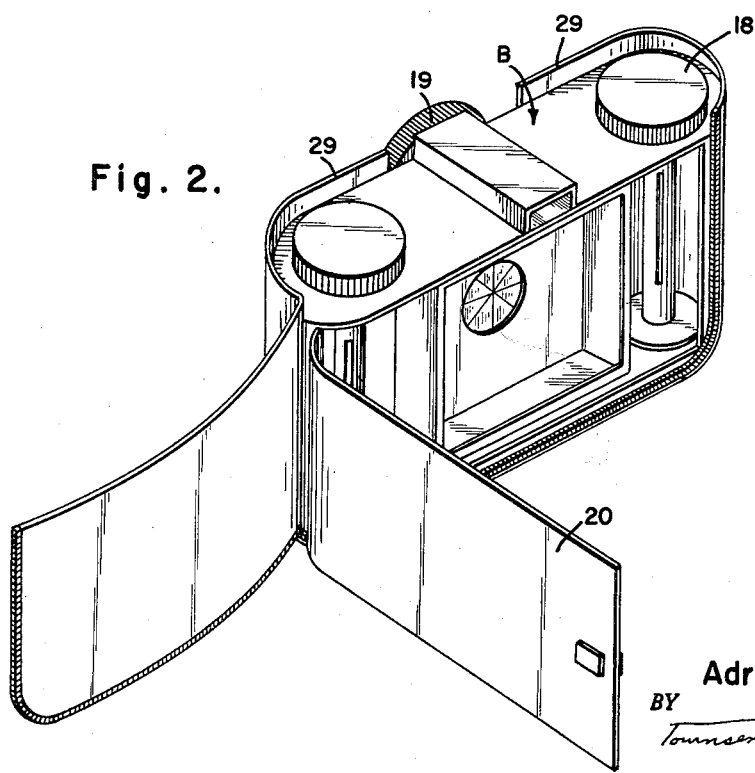
INVENTOR.
Adrian Mayer
BY
Townsend and Townsend
attorneys 3,071,172
CAMERA CASE
Adrian Mayer, 80 Bengloe Lane, Hillsborough, Calif.
Filed May 19, 1960, Ser. No. 30,137
4 Claims. (Cl. 150—52)

This invention relates to an improved camera case.

In past years with the advent of small cameras the art of camera case construction has been directed more and more to the provision of cases which can remain attached to the camera during its functional use in taking pictures. To this end many camera cases have been constructed with front pieces that are either removable or hingedly mounted on the main body of the case so that the lens, view finders and operating controls are free and functional without removing the camera from the case.

One of the principal difficulties in such cases, however, is that the camera must be removed from the case in order to load and unload the film or in order to view the ground glass on the focal plane in the event that the camera is of a ground glass focusing type.

It is accordingly a principal object of this invention to provide a unique camera case having a flap forming a portion of the body of said case which is adapted to cover the rear portion of the camera in such a way as to form a solid body for the case during normal use of the camera and which may be opened to allow access to the rear portion of the camera for either its loading, unloading or access to the focal plane ground glass.

One of the features and advantages of this invention is that the camera case is maintained in a substantially rigid condition by the use of an L-shaped zipper which joins together one side and the bottom portion of the back portion of the case when the zipper is in the closed position. The same zipper when opened allows the back portion of the camera case to be displaced to a position which allows access to the back panel of the case. By this means the back panel can be swung open, removed or otherwise displaced so that access may be had to the internal structure of the camera.

Another feature and advantage of this invention is that at least one side of the body of the camera case is formed of a sufficiently flexible material so that when the zipper is in the open position the back panel can be swung about the flexible area of the case wherein the flexible area functions in a manner similar to a hinge allowing a book like opening of the back portion of the camera case.

A further feature and advantage of this invention is that the zipper forms a sufficiently tight bond between the back portion of the case and the main body of the case so that with the zipper in the closed position the case has all the functional charcteristics of rigidity and camera protection inherent in conventional camera cases.

Other objects of the present invention will become apparent upon reading the following specification and referring to the accompanying drawings in which similar characters of reference represent corresponding parts in each of the several views.

In the drawings:

FIG. 1 is a perspective view of the improved camera case of this invention shown in its closed position.

FIG. 2 is a view similar to FIG. 1 showing the top portion of the case removed and showing the back flap of the case being in the opened position.

Referring now to the drawings there is provided a camera case generally indicated at A having a main body 15 and a top cover 16.

The camera case is formed with an interior which is complementary to the exterior of the body of a camera B.

Camera B may be of any conventional design which comprises a main body 18 and a lens 19 which projects outwardly from the front end of the camera and which has on its rear side a removable panel indicated at 20 which may be opened in order to gain access to the interior of the camera to either load or unload the film or for viewing a ground glass in the event that the camera is of such structure as will allow the viewing of the ground glass.

Panel 20 is shown hingedly mounted on one end of the camera. However, it is believed obvious that the panel could be hingedly mounted on the opposite side, on the bottom, the top or be completely removable from the back of the camera. Any of these structures would be equally well operable with the camera case of this invention.

Main body 15 of camera case A is generally formed with a bottom 25 with a back wall 26 extending upwardly from the bottom, a right side wall 27 and a left side wall 28, as viewed in FIG. 1, and two front panels 29 which have their edges spaced apart to allow for the outward projection of lens 19. The front structure, however, could be of other designs wherein the front panel could be formed of a single wall in which some provision is made for the protrusion of lens 19 either by virtue of an aperture or by virtue of a panel mounting which is hingedly or detachably mounted on the front of the case.

Back wall 26 is provided with a zipper generally indicated at 30 having a vertical leg 31 joining the back panel to the right hand side panel 27 and a horizontal bottom arm 32 joining the back panel at bottom 25 of the case.

Zipper 30 is arranged to have the zipper actuating box 36 at the upper end of leg 31 when the zipper is in the closed position and thus allowing the zipper to travel down the leg and across the arm to the left hand end of the case adjacent side 28 in order to open the back of the case.

Main body 15 is generally formed of leather, plastic or other flexible material so that left hand side wall 28 forms a virtual hinge by virtue of the flexible nature of the material. If the case is made of a more rigid material, it would be necessary to form a hinge-like vertical joining section which runs up side 28 at the approximate termination of the zipper. In other words, because of the flexible nature of the carrying case material, actuation of the back wall 26 to and from its normal position creases or scores the material to become only along a vertical segment substantially aligned with the horizontal terminal of the zipper. This segment then functions as a hinge which allows swingable movement of the back wall 26 relative to the adjacent sections of the left hand side wall 28.

In operation it can be seen that camera B is installed within the case as in the manner conventional with installation of cameras in camera cases. Thereafter when the operator desires to gain access to the rear of the case, the zipper actuating box 36 is moved down and then to the left in order to completely open the zipper. Back wall 26 is then free to swing in book-like fashion in an open position. In such a position this allows free access to panel 20 so that the panel may be opened.

After the camera has been loaded or unloaded panel 20 is again placed in a closed position relative to the camera and zipper actuating box 36 is moved to its upper right hand position thus closing the zipper. With the zipper in the closed position the camera has all the functional attributes of a completely integral camera case.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. A camera case for a camera having a removable back comprising: a main body having an interior cavity generally conforming to the exterior portion of the camera for which the case is designed to be used; said body having two side walls, a back wall and a bottom wall, said side walls and back wall terminating in a free upper end, a zipper extending from the top of said back wall closely adjacent one side wall and extending downwardly to a point adjacent the bottom of said back wall, then thence longitudinally along the bottom of said back wall to a position adjacent the other side wall of said body; said other side wall being formed of a material flexible to permit swingable movement of said back wall only along a vertical segment of said other side wall aligned with the termination of said zipper; and the area of said back wall bounded by said zipper being at least as large as and in registration with the removable back of said camera, and a top formed for removable telescopic mounting over the top of said case.

2. A camera case for a camera having a removable back comprising: a main body having an interior cavity generally conforming to the exterior portion of the camera for which the case is designed to be used; said body having two side walls, a back wall and a bottom wall; said side walls and back wall each terminating in a free upper end; a zipper extending from the top of said back wall closely adjacent one side wall and extending downwardly to a point adjacent the bottom of said back wall and thence longitudinally along the bottom of said back wall to a position adjacent the other side wall of said body; said other side wall being formed of a flexible material creased only along a vertical segment of said other side wall aligned with the termination of said zipper; and the area of said back wall bounded by said zipper being at least as large as and in registration with the removable back of said camera.

3. A case for a camera having a removable back plate comprising: a main body interiorly conforming to the exterior portion of the camera; said body having two vertical side walls, a back wall and a bottom wall; said side walls and back wall terminating in a free upper end; means to detachably join edge portions of said back wall of said case continuously along a first line and a second line normal to said first line; and the material forming said case being flexible to permit hinged movement of the back wall only along the vertical side of said case adjacent the end of the second detachably joinable line; said back wall being at least as large as and in registration with the removable back plate of said camera.

4. A case for a camera having a removable plate comprising a main body to interiorly receive a camera; said body having a displaceable wall portion; means to detachably join edges of said wall portion continuously along a first line and a second line normal to said first line; and the material forming said case being flexible to permit hinged movement of the back wall only along the vertical side of said case adjacent the end of the second detachably joinable line; said detachable wall being at least as large as and in registration with the removable plate of said camera.

References Cited in the file of this patent

UNITED STATES PATENTS

| 1,792,582 | Goldsmith | Feb. 17, 1931 |
| 2,087,211 | Marbury | July 13, 1937 |
| 2,180,191 | Bauch | Nov. 14, 1939 |

FOREIGN PATENTS

| 1,000,684 | Germany | Jan. 10, 1957 |